(12) United States Patent
Lee et al.

(10) Patent No.: US 6,952,525 B2
(45) Date of Patent: Oct. 4, 2005

(54) METHOD OF PHOTOGRAPHING BY VARYING FLASH TRIGGER TIME AND CAMERA ADOPTING THE SAME

(75) Inventors: Jin-gi Lee, Changwon-si (KR); Jae-chung Lim, Masan-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 30 days.

(21) Appl. No.: 10/827,138

(22) Filed: Apr. 19, 2004

(65) Prior Publication Data

US 2004/0247305 A1 Dec. 9, 2004

(30) Foreign Application Priority Data

Jun. 4, 2003 (KR) ................................. 10-2003-0035898
Jun. 10, 2003 (KR) ................................. 10-2003-0037130

(51) Int. Cl.[7] ............................................. G03B 15/05
(52) U.S. Cl. ......................................................... 396/61
(58) Field of Search .......................... 396/61, 155, 159, 396/165, 187; 348/370, 371

(56) References Cited

U.S. PATENT DOCUMENTS

| | | | | |
|---|---|---|---|---|
| 3,710,701 A | * | 1/1973 | Takishima et al. | 396/61 |
| 5,148,212 A | * | 9/1992 | Serikawa et al. | 396/61 |
| 2001/0004271 A1 | * | 6/2001 | Konishi | 348/371 |

* cited by examiner

Primary Examiner—W. B. Perkey
(74) Attorney, Agent, or Firm—Gardner Carton & Douglas LLP

(57) ABSTRACT

Provided herein is a method of photographing in a camera having a flash and a distance measurement unit to measure a distance from the camera to the object, which includes determining whether instructions to perform consecutive photograph are given, measuring a distance from the camera to the object, if consecutive shooting instructions are given, and determining a flash trigger time according to the result of measuring the distance, emitting a flash for the determined flash trigger time while photographing is performed, and performing the measurement and determination operation, if consecutive shooting is not completed.

19 Claims, 10 Drawing Sheets

METHOD OF PHOTOGRAPHING BY VARYING FLASH TRIGGER TIME AND CAMERA ADOPTING THE SAME

CROSS-REFERENCE TO RELATED APPLICATIONS

This application claims priority to Korean Patent Application No. 2003-35898 filed on Jun. 4, 2003, and Korean Patent Application No. 2003-37130 filed on Jun. 10, 2003, in the Korean Intellectual Property Office, the disclosure of which are incorporated herein by reference in their entirety.

TECHNICAL FIELD

The present invention relates generally to flash photography and, more particularly, to varying the flash trigger time of a camera based on the distance to an object being photographed.

BACKGROUND

In general, conventional photometric methods for controlling the level of illumination for cameras can be classified into two categories: external photometric methods that use an additional photoreceiving device located near the camera's lens to measure brightness intensity and "through the lens" (TTL) methods in which the camera has a complex circuit and an additional viewfinder to observe an object. TTL methods are often used in single lens reflex cameras.

When photographing with a flash in a consecutive shooting mode (i.e. taking multiple photos in succession), the conventional methods have problems in that overexposure (when the distance to the subject is short) or underexposure (when the distance to the subject is long) may occur.

SUMMARY OF THE INVENTION

To solve the above and/or other problems, the present invention provides a method of photographing an object in consecutive shooting mode in which the level of illumination is varied according to the distance between the camera and an object being photographed.

According to an embodiment of the invention, the method comprises determining whether the camera is being instructed to take consecutive shots, measuring a distance from the camera to the object, and determining a flash trigger time according to the distance measured. The method also comprises emitting a flash for the determined flash trigger time, and repeating the steps of measuring the distance and determining the flash trigger time until instructions for taking consecutive shots are no longer being given. The method may further comprise determining whether photography is occurring in a low brightness environment and, if it is determined that photography is occurring in a low brightness environment, performing the steps of measuring the distance and determining the flash trigger time.

According to an aspect of the invention, the flash trigger time may be calculated as a step function of the distance measured. The flash trigger time may also be determined by applying a predetermined function to the measured distance.

In another embodiment of the invention, a method for photographing in a consecutive mode is provided, in which a flash trigger time varies according to whether the distance from the camera to the object is the same in a preceding frame and a present frame. The method may include determining whether instructions to photograph are being given, photographing while emitting a flash during a predetermined flash trigger time T1, if instructions to photograph are given, determining whether consecutive shooting is being performed, determining whether a flash trigger time T2 should be corrected according to a change in the distance from the camera to the object, photographing while emitting a flash during the flash trigger time T2, and repeating the step of determining whether consecutive shooting is being performed.

According to various embodiments of the invention, a distance L1 is measured from the camera to the object, and a flash trigger time T1 is determined according to the measured distance L1. There are a variety of ways to determine the flash trigger time T1, including calculating it as a step function of the distance L1 or applying some other predetermined function to the distance L1.

In another embodiment of the invention, a corrected flash trigger time T2 may be determined according to a change in the distance from the camera to the object. In this embodiment, there is a method that comprises continuously determining whether photographing instructions are being given, if the camera is in a consecutive shooting mode, measuring a distance L2 from the camera to the object, if photographing instructions are being given, determining whether the distance L2 is the same as the distance L1 in the preceding frame and, if the distance L2 is not the same as the distance L1 in the preceding frame, photographing while emitting a flash during a predetermined flash trigger time T1, and correcting the flash trigger time, if the distance L2 is the same as the preceding frame.

In various embodiments of the invention, a corrected flash trigger time T2 is determined as a step function of the distance L2 or by applying some other function to the distance L2. The corrected flash trigger time T2 may also be calculated by increasing a CCD sensitivity gain width by $\Delta EV$, if the distance L2 is the same as the preceding frame.

In yet another embodiment of the invention, a determination is made regarding whether photography is occurring in a low brightness environment. A determination may also be made regarding whether consecutive photography is being performed. A flash is emitted during a predetermined flash trigger time T1 if photography is occurring in a low brightness environment. Otherwise, no flash is emitted.

According to another embodiment of the invention, a camera comprises a photographing mode selection unit operated by a user to generate and output a consecutive shooting mode signal, a release switch operated by the user to generate and output a photographing instruction signal, a distance measurement unit to measure a distance L1 from the camera to an object, a control unit to determine a flash trigger time T1 according to the measured distance L1 and output a flash trigger signal according to the flash trigger time T1 in response to the consecutive shooting mode signal, an illumination unit, a flash capacitor, a flash that emits a flash in response to the flash trigger signal, and an image photographing unit to photograph an object. The camera may further comprise a brightness measurement unit to measure the brightness of the environment and output a brightness signal, wherein the control unit determines the flash trigger time T1 according to the distance L1 in response to the brightness signal and outputs a flash trigger signal according to the flash trigger time T1.

According to another embodiment of the invention, a camera comprises a release switch operated by a user to generate and output a photographing instruction signal, a mode selection unit operated by the user to generate and output a consecutive shooting mode signal, a distance measurement unit to measure a distance from the camera to an object, a control unit to determine a flash trigger time according to the measured distance, compare the distances measured in a present frame and a preceding frame in response to the consecutive shooting mode signal, determine a flash trigger time corrected according to the result of the comparison, and output a flash trigger signal according to the determined flash trigger time. The camera also includes an illumination unit, a flash capacitor, and a flash, to emit flash in response to the flash trigger signal, and an image photographing unit to photograph the object.

The camera further comprises a brightness measurement unit to measure a brightness of an environment in which photographing is performed and output a brightness signal, wherein the control unit determines the flash trigger time according to the measured distance, compares the distances measured in the present frame and the preceding frame in response to the brightness signal, determines the flash trigger time corrected according to the result of comparison, and outputs a flash trigger signal according to the determined flash trigger time.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
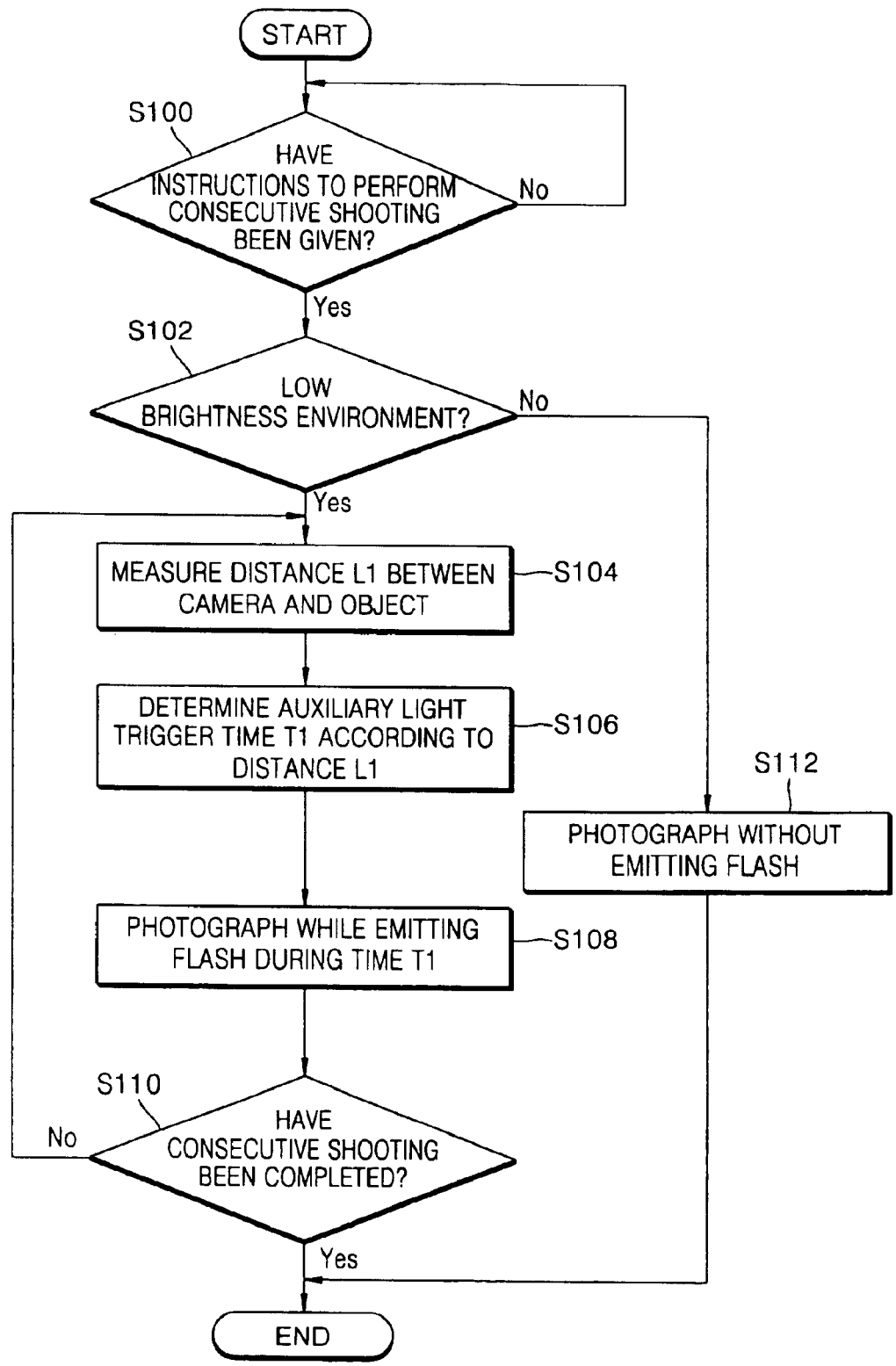
FIG. 1 is a flow chart illustrating a method of photographing according to an embodiment of the invention.

Referring to FIG. 1, a method of photographing according to an embodiment of the present invention includes steps S100 through S112. The method is carried out on a camera that is in a consecutive shooting mode, and varies the flash trigger time according to the measured distance between a camera and an object.

First, the camera determines whether instructions to perform consecutive shooting have been given (S100). The instructions to perform consecutive shooting can be given by a release switch included in the camera or a remote control. When the instructions to perform consecutive shooting have been given, then the camera determines whether photography is occurring in a low brightness environment (S102). If it is determined that photography is not occurring in a low brightness environment, then the camera proceeds with the photography without emitting a flash (S112).

If the camera determines that photography is occurring in a low brightness environment, it measures the distance L1 between the camera and the object (S104). After Step S104, the camera determines a flash trigger time T1 based on the measured distance L1 (S106). After Step S106, the camera emits the flash for the time T1 while it photographs the object (S108). After Step S108, if consecutive shooting is not completed, steps S104 and S106 are repeated. Once consecutive shooting is completed, process is terminated (S110).

Figure 2:
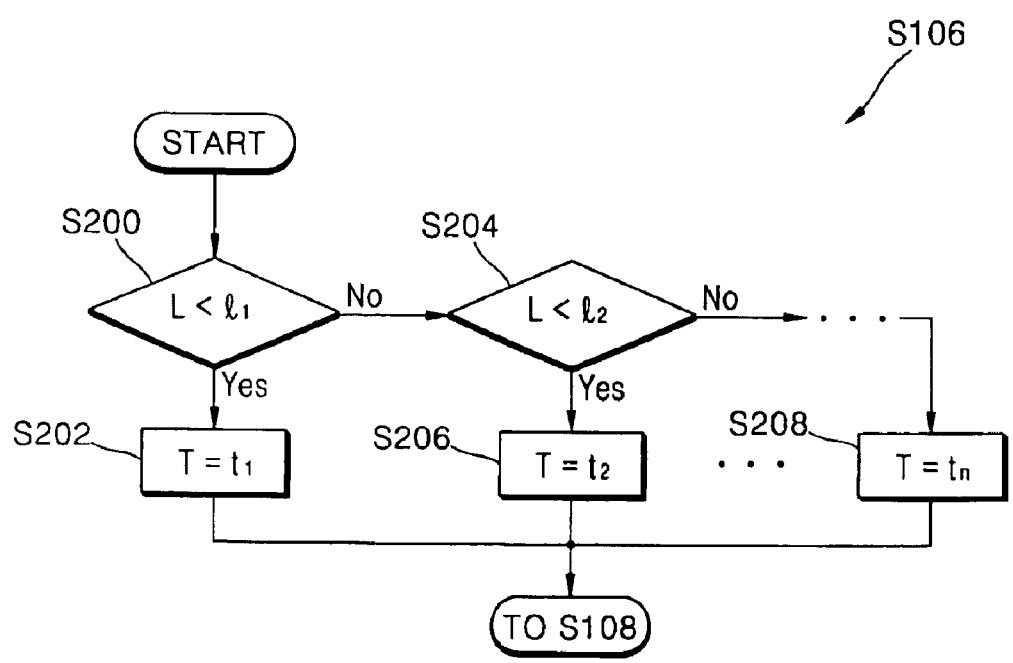
FIG. 2 is a flow chart illustrating Step S106 of FIG. 1 according to an embodiment of the invention.

FIG. 2 illustrates how Step S106 of FIG. 1 may be implemented according to an embodiment of the invention. In this implementation, Step S106 is made up of Steps 200 through 208 in which the camera determines the flash trigger time T1 using a step function of the distance L. The step function has n steps, where n≧2. The camera compares L1 with benchmarks, referred to as 11 and 12. When the distance L1 is less than 11 (S200), the camera sets the flash trigger time T1 equal to t1 (S202). When the distance L1 is not less than 11 and less than 12 (S204), the camera sets the flash trigger time T1 equal to t2 (S206). Once the flash trigger time T1 is determined according to the distance L1, the camera proceeds to Step S108 of FIG. 1.

Table 1 and Table 2 show embodiments of the invention in which the flash trigger time T is determined according to a step function of the distance L between the camera and the object. Tables 1 and 2 show values for two possible step functions, which have 4 and 3 steps, respectively. It should be noted that L and T are generic. For example, L1 or L2 can be substituted for L, and T1 or T2 can be substituted for T. It should also be noted that the step function may be represented in a memory of the camera as a lookup table

TABLE 1

| Distance L | Shortest Distance (L < 0.5 m) | Short Distance (0.5 ≦ L < 1.0 m) | Intermediate Distance (1.0 ≦ L < 3.0 m) | Long Distance (L ≧ 3.0 m) |
|---|---|---|---|---|
| Trigger Time T | 30 µs | 80 µs | 300 µs | 4 ms |

TABLE 2

| Distance L | Short Distance (L < 1.0 m) | Intermediate Distance (1.0 ≦ L < 3.0 m) | Long Distance (L ≧ 3.0 m) |
|---|---|---|---|
| Trigger Time T | 30 µs | 80 µs | 300 µs |

Figure 3:
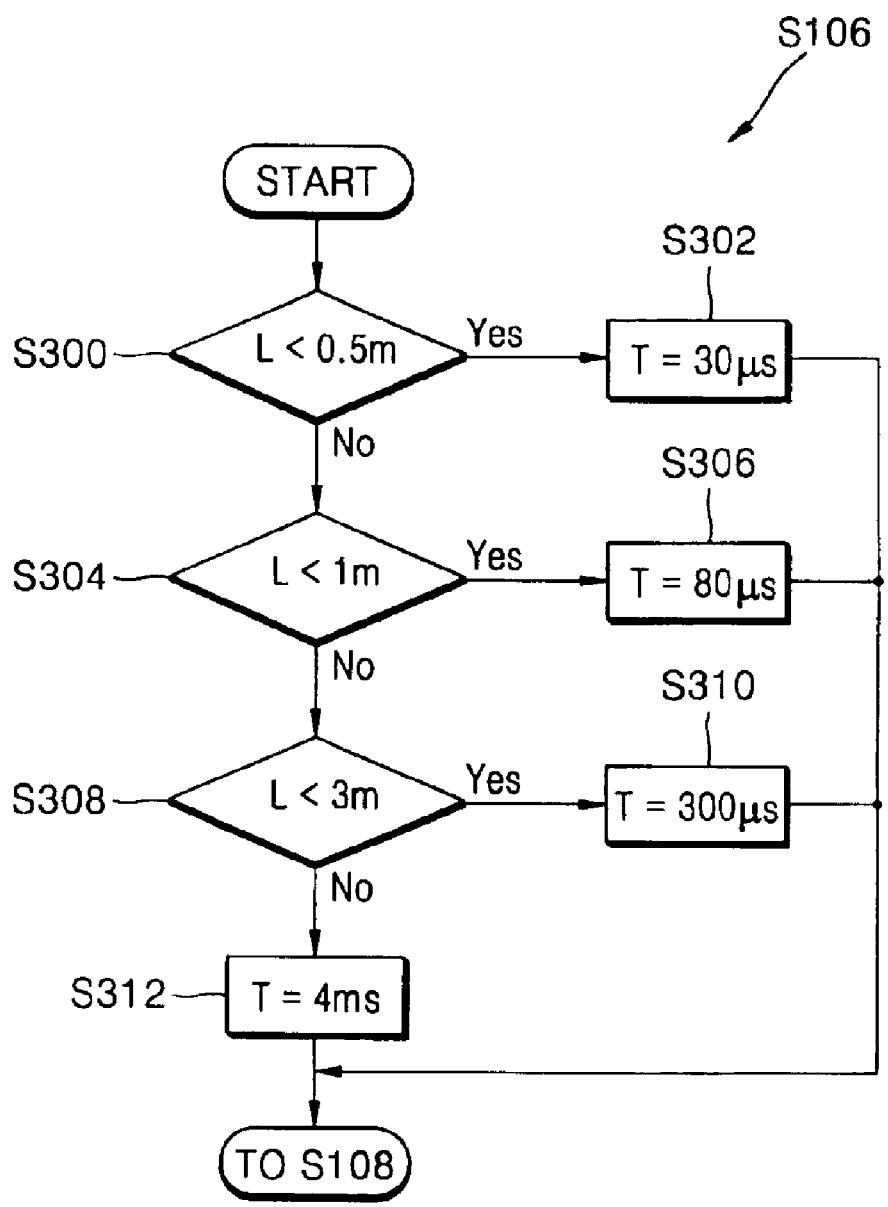
FIG. 3 is a flow chart illustrating a method of determining the flash trigger time T1 shown in FIG. 2 according to an embodiment of the invention.

FIG. 3 is a flow chart for illustrating a method for determining the flash trigger time T based on Table 1 according to an embodiment of the invention. When the distance L1 is less than 0.5 m (S300), the camera sets the flash trigger time T1 to 30 µs (S302). When the distance L1 is less than 1 m (S304), the camera sets the flash trigger time T1 to 80 µs (S306). When the distance L1 is less than 3 m (S308), the camera sets the flash trigger time T1 to 300 µs (S310). When the distance L1 is not less than 3 m, the camera sets the flash trigger time T1 to 4 ms (S312). After performing Step S312, the camera proceeds to Step S108 of FIG. 1.

Figure 4:
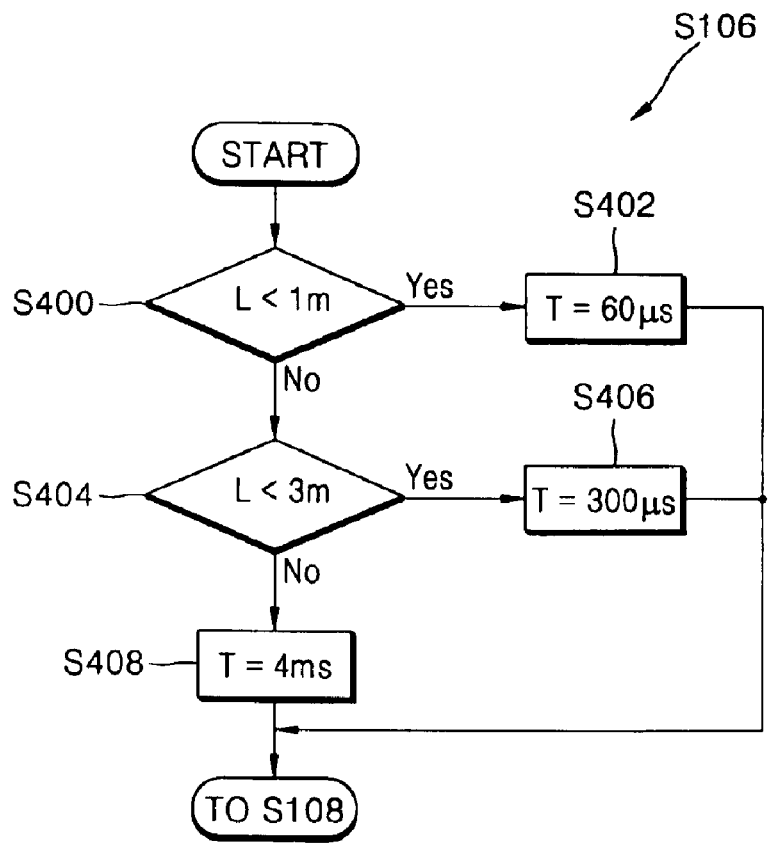
FIG. 4 is a flow chart illustrating a method for determining the flash trigger time T1 shown in FIG. 2 according to another embodiment of the invention.

FIG. 4 is a flow chart illustrating a method of determining the flash trigger time T based on Table 2 according to another embodiment of the present invention. When the distance L1 is less than 1 m (S400), the camera sets the flash trigger time T1 to 60 μs (S402). When the distance L1 is less than 3 m (S404), the camera sets the flash trigger time T1 to 300 μs (S406). When the distance L1 is not less than 3 m, the camera sets the flash trigger time T1 to 4 ms (S408). After performing Step S408, the camera proceeds to Step S108 of FIG. 1.

Figure 5:
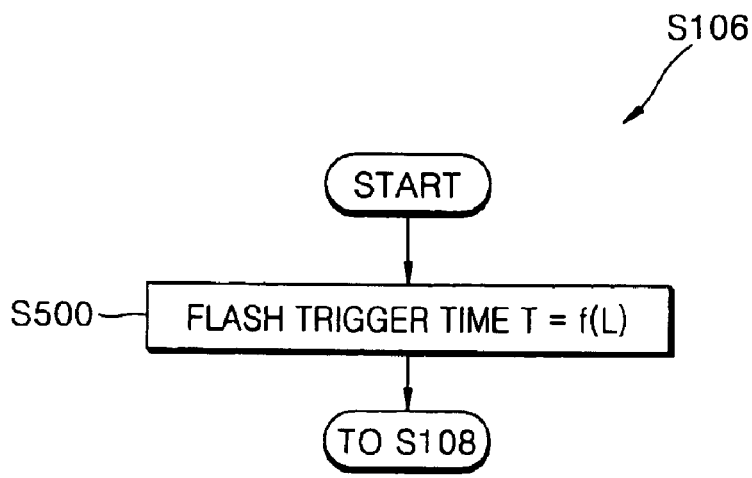
FIG. 5 is a flow chart illustrating Step S106 of FIG. 1 according to another embodiment of the invention.

FIG. 5 is a flow chart illustrating another way in which Step S106 of FIG. 1 may be implemented. The camera generates the flash trigger time T1 as a predetermined function f(L) based the distance L1 measured between the camera and the object (S500). After Step S500, the camera performs Step S108 of FIG. 1. The function may be implemented in a variety of ways, and does not necessarily have to be a step function such as those illustrated in Table 1 and Table 2. The function f(L) may be a continuous function, for example.

Figure 6A:
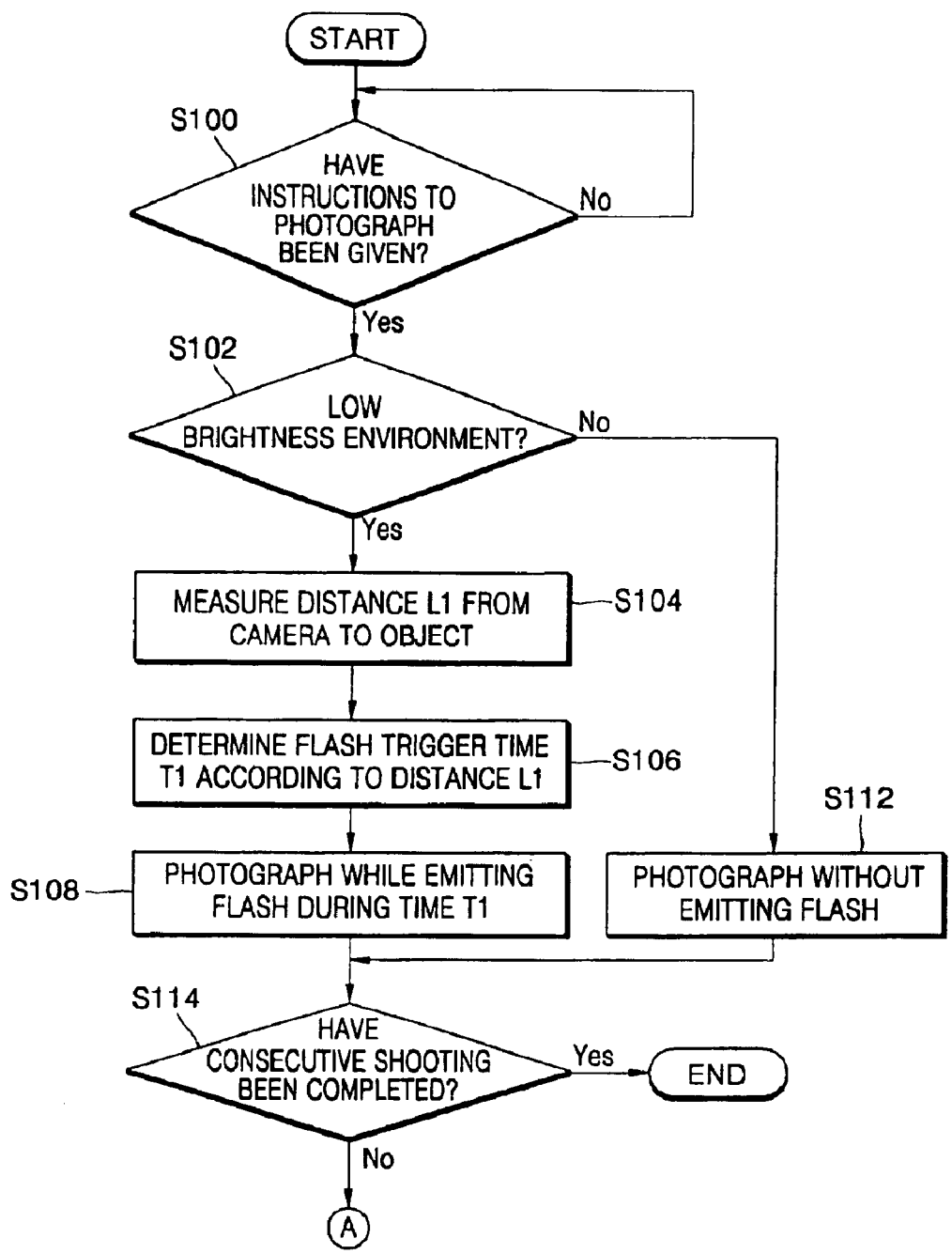
FIGS. 6a and 6b show a flow chart illustrating a method of photographing according to another embodiment of the invention.
Figure 6B:
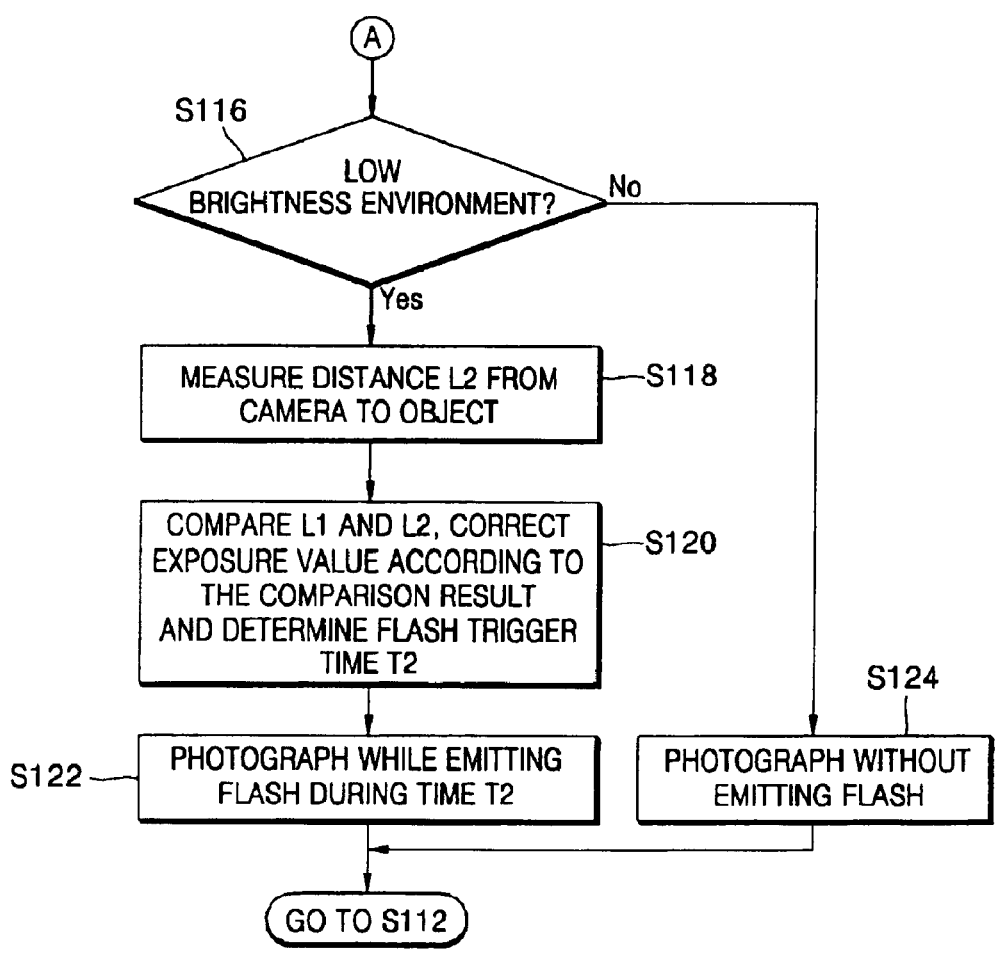

Referring to FIGS. 6a and 6b, a method of photographing according to another embodiment of the present invention includes Steps S100 through S124, in which the camera varies a flash trigger time based on a determination regarding whether the distance between the camera and an object is the same in the present frame as it was in the preceding frame. This method may be performed in a camera having a flash and an object distance measurement unit. According to this embodiment, the camera continuously checks to determine whether instructions to take a photograph have been given (S100). An instruction to take a photograph can be made by a release switch included in the camera or by a remote control. When the instructions to take a photograph have been input, the camera determines whether there is a low brightness environment (S102). If the camera determines that there is not a low brightness environment, it takes the photograph without emitting a flash (S112).

If, in contrast, the camera determines that there is not a low brightness environment, the camera measures a distance L1 between itself and the object (S104). After Step S104, the camera determines a flash trigger time T1 based on the measured distance L1 (S106). Also after Step S106, the camera emits a flash for the duration of time T1 while it photographs the object (S108). After Step S108 or S112, the camera determines whether consecutive shooting has been completed (S114). If consecutive shooting is completed, the camera terminates the process of FIGS. 6a and 6b.

But if consecutive shooting is not completed, then the camera determines whether there is a low brightness environment (S116) (FIG. 6b). If the camera determines that the there is not a low brightness environment, then camera photographs the object without emitting a flash (S124). It should be noted that the brightness of the lighting may have changed from the previous frame, and that, for example, the flash may have been emitted on the previous frame, but will not be emitted for the present frame. If there is a low brightness environment, the camera measures a distance L2 from itself to the object for the present frame (S118).

After Step S118, the camera compares the distance L1 of the preceding frame and the distance L2 of the present frame and determines a corrected flash trigger time T2 according to the result of comparison (S120). When the photographing method shown in FIGS. 6a and 6b is performed in a digital camera, in Step S120, a CCD (charge coupled device) sensitivity gain width can be corrected as much as a predetermined ΔEV, which will be described in a following description of Step S718 of FIG. 7.

Referring again to FIG. 6b, following Step S120, the camera emits a flash for the corrected trigger time T2 while photographing the object (S122). After Step S122 or 124, the camera returns to Step S114.

Figure 7:
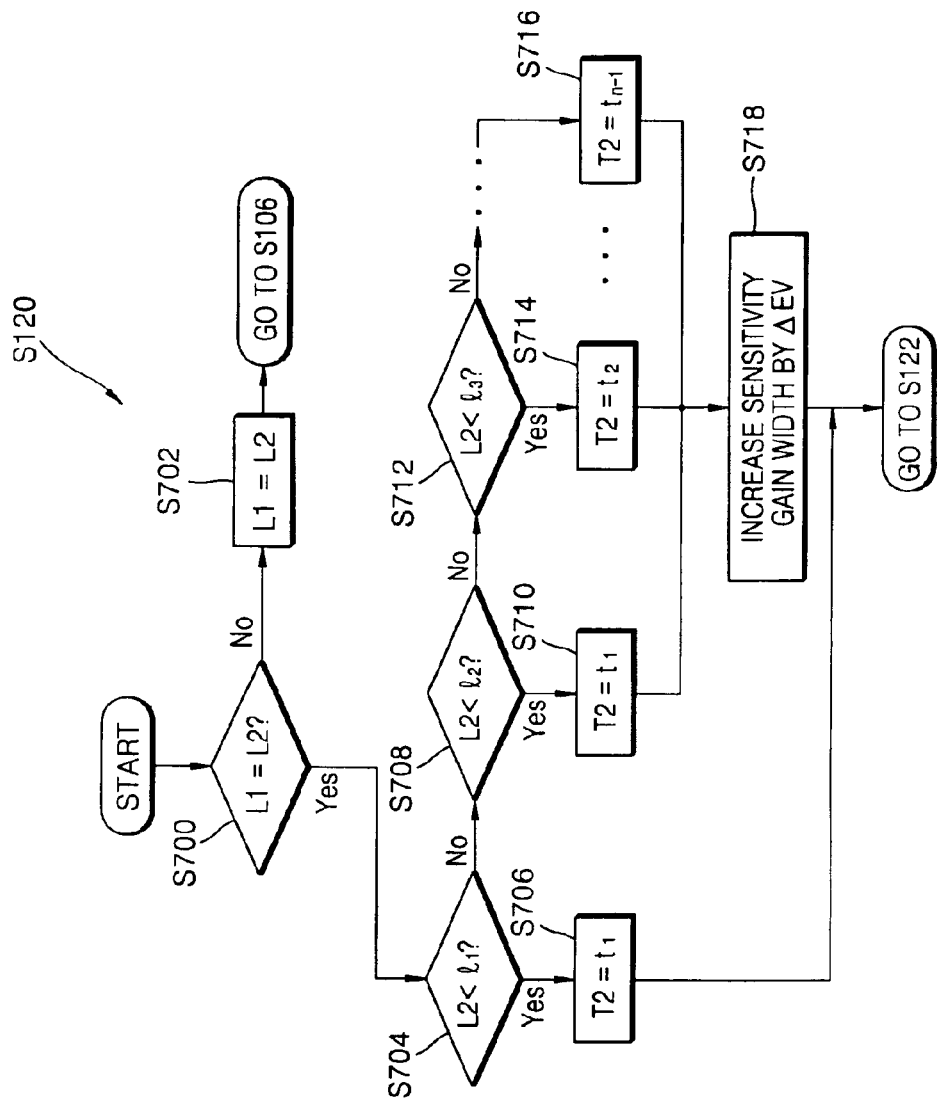
FIG. 7 is a flow chart illustrating Step S120 of FIG. 6 according to an embodiment of the invention.

FIG. 7 is a flow chart illustrating a possible implementation of Step S120 of FIG. 6b according to an embodiment of the invention. Referring to FIG. 7, Step S120 may be implemented as Steps S700 through S718 in which the camera calculates a corrected flash trigger time T2 as a step function of the distance L2. The step function has n steps, where n≧2. Then, the camera determines whether the distance L1 of the preceding frame and the distance L2 of the present frame are the same (S700). If the distance L1 and the distance L2 are not the same, the camera overwrites the distance L1 with the distance L2 and then performs Step S106 shown in FIG. 6a. If the distance L1 of the preceding frame and the distance L2 of the present frame are the same, the camera corrects the flash trigger time according to Steps S7014 S716. When FIG. 7 and FIG. 2 are compared, it can be seen that the time T2 according to the distance L2 shown in FIG. 7 is shorter than the time T1 according to the distance L1 shown in FIG. 2, except when the distance L2 is less than 11.

When implemented on a digital camera, Step S718 (FIG. 7) is also performed, in which the corrected flash trigger time T2 is determined, and the CCD sensitivity gain width is increased by a predetermined ΔEV. Since the flash trigger time T2 is corrected to decrease in Steps S700 through S716, the time T2 is corrected by ΔEV, for example, +1 EV, to increase the CCD sensitivity gain width. In other words, for a digital camera, the decrease in the flash trigger time T2 is compensated by increasing the CCD sensitivity gain width. However, when the distance L2 is less than 11, since the time T2 is determined to be the minimum flash trigger time, correction of the CCD sensitivity gain width is not needed. After the CCD sensitivity gain width is corrected, Step S122 shown in FIG. 6b is performed.

Figure 8:
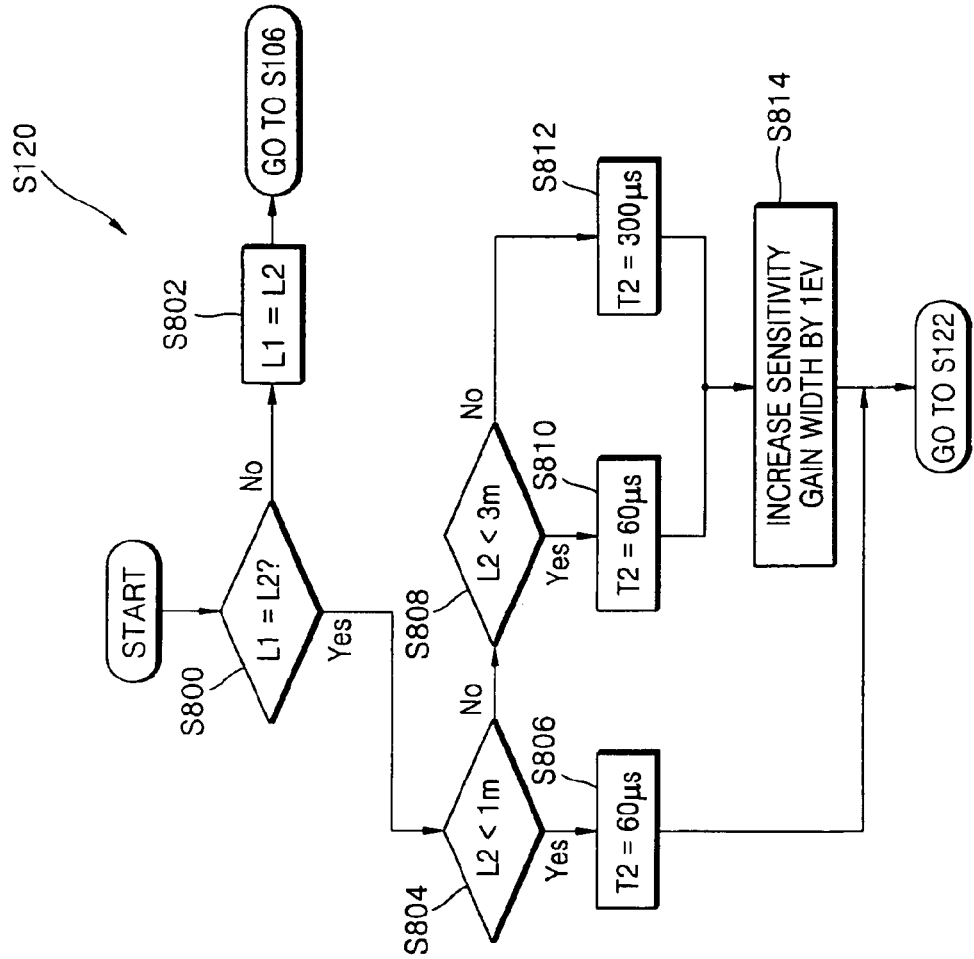
FIG. 8 is a flow chart illustrating a method for determining a flash trigger time T2 shown in FIG. 7 according to an embodiment of the invention.

Referring to FIG. 8, a flow chart is shown that illustrates a method of determining the flash trigger time T2 shown in FIG. 7 according to an embodiment of the invention. First, is the camera determines whether the distance L2 of the present frame is the same as the distance L1 of the preceding frame (S800). If the distances L1 and L2 are not the same, the camera overwrites the distance L1 with the distance L2 and Step S106 shown in FIG. 6a is performed.

When the distance L2 of the present frame is the same as the distance L1 of the preceding frame, the flash trigger time is corrected (S804 through S812). When FIG. 8 and FIG. 3 are compared, it can be seen that the time T2 according to the distance L2 shown in FIG. 8 is shorter than the time T1 according to the distance L1 shown in FIG. 3 except when the distance L2 is less than 11. Step S814 is performed if the camera is a digital camera. After the corrected flash trigger time T2 is determined, the CCD sensitivity gain width is increased by +1 EV. However, when the distance L2 is less than 11, since the time T2 is determined to be the minimum flash trigger time of 60 μs, correction of the CCD sensitivity gain width is not needed. After the CCD sensitivity gain width is corrected, Step S122 shown in FIG. 6b is performed.

Figure 9:
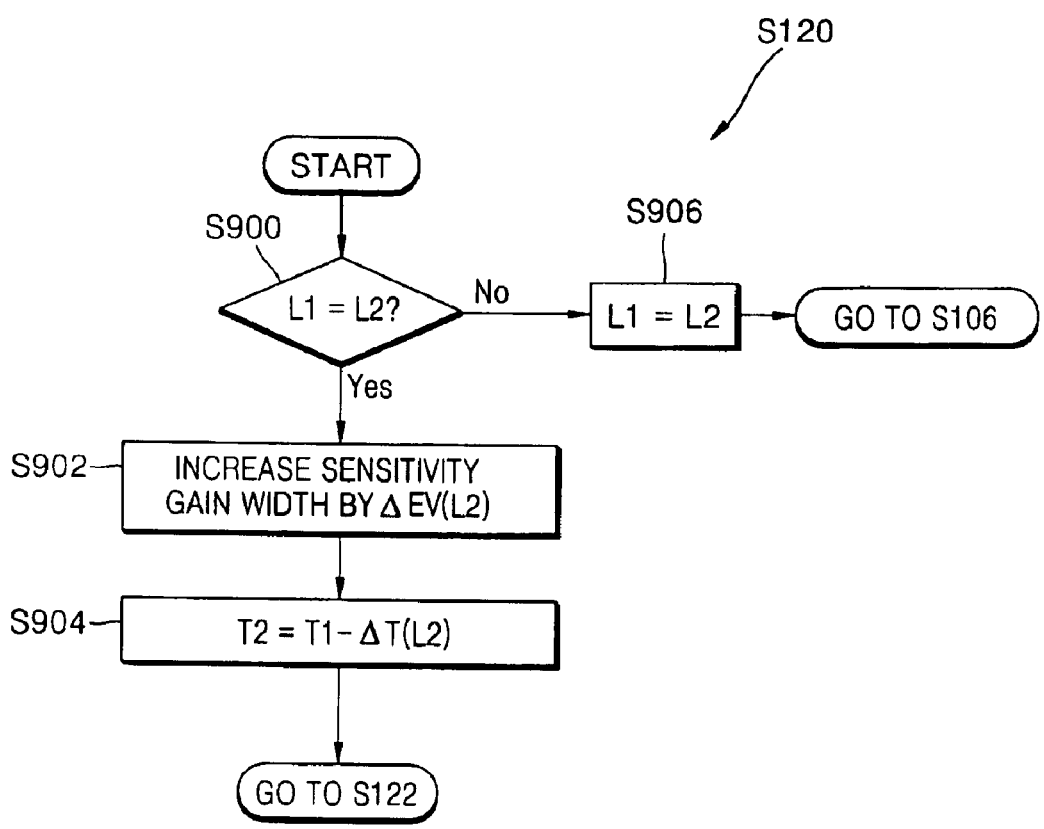
FIG. 9 is a flow chart illustrating Step S120 of FIG. 6b according to another embodiment of the invention.

FIG. 9 is a flow chart illustrating a way of implementing Step S120 of FIG. 6b according another embodiment of the invention. This implementation of Step S120 includes Steps S900 through S906 in which the camera determines the corrected flash trigger time T2 by applying a predetermined function to the distance L2. First, the camera determines whether the distance L1 of the preceding frame is the same as the distance L2 of the present frame (S900). If the distances L1 and L2 are not the same, the camera overwrites the distance L1 with the distance L2 and then performs Step S106 of FIG. 6a (Step S906). If the camera is a digital camera, then it also performs Step S902. At Step S902, when the distance L1 of the preceding frame is the same as the distance L2 of the present frame, the CCD sensitivity gain width is corrected by applying a predetermined function of ΔEV to the distance L2. After Step S902, the camera determines the corrected flash trigger time T2 T1−ΔT(L2) by applying a predetermined function of ΔT(L2) to the distance L2 (S904).

Figure 10:
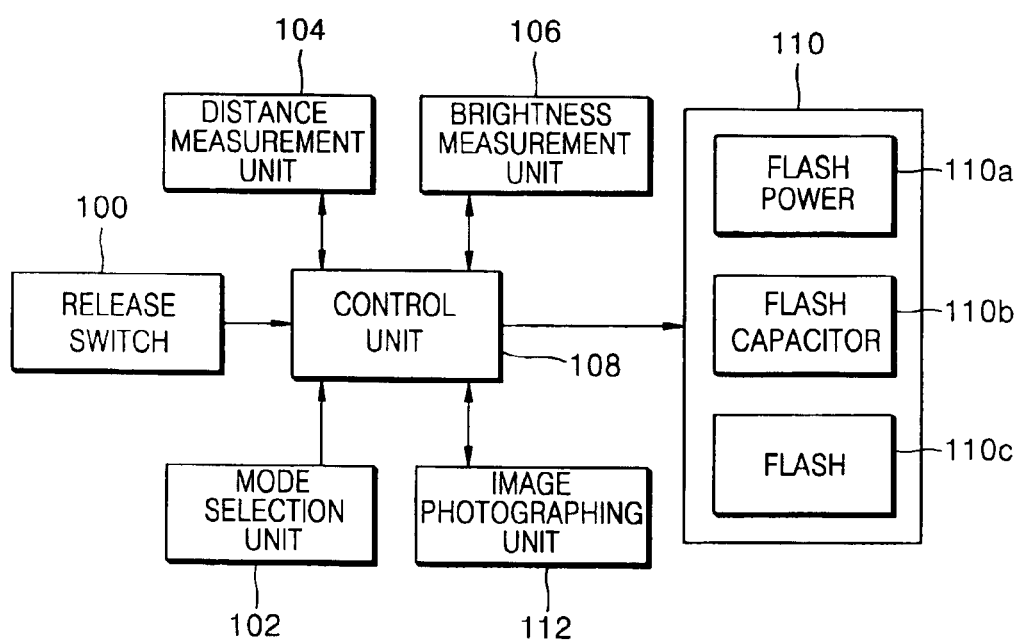
FIG. 10 is a block diagram illustrating the structure of a camera adopting a photographing method of an embodiment of the invention.

FIG. 10 is a block diagram illustrating the structure of a camera configured according to an embodiment of the invention. The camera includes a release switch 100, a mode selection unit 102, a distance measurement unit 104, a brightness measurement unit 606, a control unit 108, an illumination unit 110, and an image photographing unit 112. The mode selection unit 102 generates a consecutive shooting mode signal produced from the operation of a user. The release switch 100 generates and outputs a photographing instruction signal produced from the operation of the user, to perform Step S100 of FIG. 1 and FIG. 6a. The distance measurement unit 104 measures the distance L1 between the camera and the object to perform Step S104 of FIG. 1. And the distance measurement unit 104 measures the distances L1 and L2 between the camera and the object, to perform Steps S104 and S118 of FIGS. 6a and 6b.

To perform Step S106, the control unit 108, determines the flash trigger time T1 according to the measured distance L1 and generates a flash trigger signal. And the control unit 108, to perform Step S120 of FIG. 6, compares the results of measuring the distances L1 and L2 of the present frame and the preceding frame in response to the brightness signal, determines the flash trigger time T2 corrected according to the result of comparison, and outputs a flash trigger signal according to the determined flash trigger time T2.

The illumination unit 110 includes a power unit 110a, a flash capacitor 110b, and a flash 110c and a emits flash in response to the flash trigger signal, to perform Steps S108 of FIG. 1, and Steps S108, S122 of FIGS. 6a and 6b. The flash 110c can be implemented as a xenon (Xe) tube, for example.

The brightness measurement unit 106 measures the brightness of a photographing environment and outputs a brightness signal, to perform Steps S102 and S116. In a low brightness environment, the control unit 108 determines the flash trigger time T1 according to the distance L1 and outputs a flash trigger signal according to the time T1 to perform Step S104 of FIG. 1 and FIG. 6a. In a low brightness environment, the control unit 108, to perform Step S120 of FIG. 6b, compares the measured distances L1 and L2 of the present frame and the preceding frame in response to the brightness signal, determines the flash trigger time T2 corrected according to the result of the comparison, and outputs a flash trigger signal according to the determined flash trigger time T2.

The image photographing unit 112 photographs an image of the object to perform Steps S108, S112, S122, and S124.

It can be seen from the foregoing that, in the various embodiments of the invention that have been described, the level of illumination can be controlled according to the change in the distance between the camera and the object. Thus, when the distance with respect to the object varies continuously, in particular, when consecutive shooting is performed in a dark place, overexposure or underexposure due to short or long distances can be prevented. Also, when consecutive shooting is performed at a far distance, since the flash trigger time is corrected to be shorter, complete discharge of the flash capacitor is prevented and charging time is reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for taking photographs, the method comprising:
   determining whether consecutive photographs are to be taken;
   if it is determined that consecutive photographs are to be taken, performing further steps comprising
   measuring a distance from the camera to the object,
   determining a flash trigger time based on the measured the distance;
   emitting a flash for the determined flash trigger time while photographing the object; and
   repeating the steps of measuring a distance and determining a flash trigger time until there are no further consecutive photographs to be taken.

2. The method of claim 1, further comprising:
   determining whether there is a low brightness environment; and
   performing the steps of measuring a distance and determining a flash trigger time based on the low brightness environment determination.

3. The method of claim 2, wherein the step of determining a flash trigger time comprises determining the flash trigger time based on a step function of the measured distance, wherein the step function includes at least two steps.

4. The method of claim 1, wherein, the step of determining a flash trigger time comprises determining the flash trigger time by applying a predetermined function to the measured distance.

5. A method of photographing in a consecutive mode by using a flash in a camera having the flash and a distance measurement unit to measure a distance from the camera to an object, the method comprising:
   determining the distance from the camera to the object in a first frame;
   determining the distance from the camera to the object in a second frame; and
   varying the flash trigger time according to whether the distance from the camera to the object is the same in first frame and the second frame.

6. The method of claim 5, further comprising:
   determining whether instructions to take a photograph have been given;
   if it is determined that instructions to take a photograph have been given, taking a first photograph while emitting a flash during a flash trigger time T1;
   determining whether a consecutive shooting is to be performed;
   if it is determined that consecutive shooting is to be performed, determining a flash trigger time T2 corrected according to a change in the distance from the camera to the object; and
   taking a second photograph while emitting a flash during the flash trigger time T2.

7. The method of claim 6, further comprising:

measuring a distance L1 from the camera to the object; and determining the flash trigger time T1 according to the measured distance L1.

8. The method of claim 7, wherein the flash trigger time T1 is determined based on a step function of the measured distance L1, the step function having at least two steps.

9. The method of claim 7, wherein the flash trigger time T1 is determined by applying a predetermined function to the distance L1.

10. The method of claim 6, further comprising:

continuously determining whether photographing instructions are given;

measuring a distance L2 from the camera to the object;

determining whether the distance L2 is the same as the distance L1 in the preceding frame;

if the distance L2 is not the same as the distance L1 in the preceding frame, photographing while emitting a flash during a predetermined flash trigger time T1; and correcting the flash trigger time, if the distance L2 is the same as the preceding frame.

11. The method of claim 10, wherein the corrected flash trigger time T2 is determined as a step function of the distance L2.

12. The method of claim 10, wherein the corrected flash trigger time T2 is determined by applying a predetermined function to the distance L2.

13. The method of claim 10, further comprising increasing a CCD sensitivity gain width by $\Delta EV$, if the distance L2 is the same as the preceding frame.

14. The method of claim 6, further comprising:

determining whether photographing instructions have been given;

if it is determined that photographing instructions have been given, determining whether there is a low brightness environment;

if it is determined that there is a low brightness environment, photographing while emitting a flash during a predetermined flash trigger time T1;

if it is determine that there is not a low brightness environment, photographing without emitting a flash; and determining whether consecutive shooting is to be performed.

15. The method of claim 14, further comprising:

determining whether consecutive shooting is to be performed;

if it is determined that consecutive shooting is to be performed, determining whether there is a low brightness environment;

if it is determined that there is a low brightness environment, photographing while emitting a flash during a predetermined flash trigger time T1;

if it is determine that there is not a low brightness environment, photographing without emitting a flash; and determining whether consecutive shooting is to be performed.

16. A camera comprising;

a photographing mode selection unit operated by a user to generate and output a consecutive shooting mode signal;

a release switch operated by the user to generate and output a photographing instruction signal;

a distance measurement unit to measure a distance L1 from the camera to an object;

a control unit to determine a flash trigger time T1 according to the measured distance L1 and output a flash trigger signal according to the flash trigger time T1 in response to the consecutive shooting mode signal;

an illumination unit having a predetermined power, a flash capacitor, and a flash and emitting a flash in response to the flash trigger signal; and an image photographing unit to take a photograph.

17. The camera of claim 16, further comprising a brightness measurement unit to measure the brightness of an environment in which photographing is performed and output a brightness signal, wherein the control unit determines the flash trigger time T1 according to the distance T1 in response to the brightness signal and outputs a flash trigger signal according to the flash trigger time T1.

18. A camera comprising:

a release switch operated by a user to generate and output a photographing instruction signal;

a mode selection unit operated by the user to generate and output a consecutive shooting mode signal;

a distance measurement unit to measure a distance from the camera to an object;

a control unit to determine a flash trigger time according to the result of measuring the distance, compare the results of measuring the distances in a present frame and a preceding frame in response to the consecutive shooting mode signal, determine a flash trigger time corrected according to the result of comparison, and output a flash trigger signal according to the determined flash trigger time;

an illumination unit having a predetermined electric power, a flash capacitor, and a flash, to emit flash in response to the flash trigger signal; and an image photographing unit to photograph the object.

19. The camera of claim 18, further comprising a brightness measurement unit to measure a brightness of an environment in which photographing is performed and output a brightness signal, wherein the control unit determines the flash trigger time according to the result of measuring the distance, compares the results of measuring the distances in the present frame and the preceding frame in response to the brightness signal, determines the flash trigger time corrected according to the result of comparison, and outputs a flash trigger signal according to the determined flash trigger time.

* * * * *